(12) United States Patent
Stark

(10) Patent No.: US 9,020,344 B2
(45) Date of Patent: Apr. 28, 2015

(54) UNIFIED SWITCHING FABRIC ARCHITECTURE

(75) Inventor: Jason Blain Stark, Holmdel, NJ (US)

(73) Assignee: Zephyr Photonics, Zephyr Cove, NV (US)

(*) Notice: Subject to any disclaimer, the term of this patent is extended or adjusted under 35 U.S.C. 154(b) by 332 days.

(21) Appl. No.: 13/071,377

(22) Filed: Mar. 24, 2011

(65) Prior Publication Data

US 2011/0236019 A1 Sep. 29, 2011

Related U.S. Application Data

(60) Provisional application No. 61/317,249, filed on Mar. 24, 2010.

(51) Int. Cl.
| | | |
|---|---|---|
| *H04J 14/00* | (2006.01) | |
| *H04Q 11/00* | (2006.01) | |
| *H04L 12/933* | (2013.01) | |
| *H04B 10/20* | (2006.01) | |
| *H04L 12/931* | (2013.01) | |
| *H04L 12/40* | (2006.01) | |

(52) U.S. Cl.
CPC ............ *H04Q 11/0005* (2013.01); *H04L 49/10* (2013.01); *H04L 49/357* (2013.01); *H04L 2012/4028* (2013.01); *H04Q 11/0062* (2013.01); *H04Q 11/0071* (2013.01); *H04Q 2011/0052* (2013.01); *H04Q 2011/0064* (2013.01)

(58) Field of Classification Search
USPC .................................................... 398/39–87
See application file for complete search history.

(56) References Cited

U.S. PATENT DOCUMENTS

| | | | |
|---|---|---|---|
| 7,362,936 | B2 | 4/2008 | Stark et al. |
| 7,515,797 | B2 | 4/2009 | Stark et al. |
| 7,515,798 | B2 | 4/2009 | Stark et al. |
| 2005/0259571 | A1* | 11/2005 | Battou .......................... 370/217 |
| 2010/0061726 | A1* | 3/2010 | Barbarossa et al. ............ 398/48 |

OTHER PUBLICATIONS

Georgios I. Papadimitriou et al., "Optical Switching: Switch Fabrics, Techniques, and Architectures," Journal of Lightwave Technology, vol. 21, No. 2, pp. 384-405, Feb. 2003, 22 pages.
Harry J.R. Dutton, "Understanding Optical Communications," IBM, International Technical Support Organization, Retrieved from http://www.redbooks.ibm.com, 638 pages, Sep. 1998.

(Continued)

*Primary Examiner* — Daniel Dobson

(57) ABSTRACT

A unified network and elements thereof, including a switch fabric, is provided. The switch fabric may include a plurality of transport elements and a first signal-communication media. The transport elements may be adapted to communicatively couple and to communicate, via the first signal-communication media, transport signals adapted for communication among any of the plurality of transport elements. At least one transport element may be further adapted to communicate, via a second signal-communication media, signals and/or sets of signal originating from and/or terminating to one or more network nodes. Each of the electrical signals may be formatted in accordance with a protocol for electrical signals. And one or more of the transport signals may include the electrical signals in adapted form. Additionally and/or alternatively, one or more of the transport signals may be formed from, or as a function of, the electrical signals.

22 Claims, 11 Drawing Sheets

(56) References Cited

OTHER PUBLICATIONS

Benjamin A. Small et al., "The Current and Future State of Optical Switching Technologies as Related to the Data Vortex Photonic Switching Architecture," 6 pages, Feb. 2004.

Qimin Yang et al., "New Switch Fabric Architecture for Bursty Traffic," pp. 43-44, © 2002 IEEE, 2 pages.

\* cited by examiner

UNIFIED SWITCHING FABRIC ARCHITECTURE

CROSS-REFERENCE TO RELATED APPLICATIONS

This application claims the benefit of U.S. Provisional Application Ser. No. 61/317,249, filed Mar. 24, 2010, entitled "Unified Switching Fabric Architecture," which is incorporated herein by reference in its entirety.

BACKGROUND

1. Field

The following generally relates to networking architectures. More particularly, the following relates to unified networks, and elements thereof, for vehicles, such as aircrafts, artificial satellites, spacecrafts watercrafts and the like. The following further relates to networking architectures and/or unified networks for other (i.e., non-vehicular) applications.

2. Related Art

Aircraft avionics architectures have evolved over the past fifty years or so in response to developments in electrical, electronic and optical communication and communication media technologies. First generation avionic architectures were distributed analog systems. In these systems, signals were generated by sensors on the aircraft. These signals were passed as modulated electrical signals in analog format to user interfaces that presented the processed signals in an intelligible manner.

Second generation avionics architectures replaced the analog signals with digitally formatted signals, with an associated increase in signal robustness, immunity to interference, and reliability. The organizational principle, however, was unchanged, representing distributed digital systems. That is, individual digital signals were routed on electrical wires to individual user interface elements.

As the electronics technologies continued to improve, multiplexed databuses were introduced, allowing many independent digital signals to utilize a common wiring infrastructure. This was achieved mostly by electronically multiplexing the digital signals onto databus wiring, using protocols defined to ensure orderly utilization of the shared medium—the databus wiring.

Third generation avionic architectures are referred to as federated architectures to signify all elements of a specific aircraft system, such as the navigational system. Third generation avionic architectures share a common digital interconnect infrastructure. Elements of a separate aircraft system, such as the communications system, also share a common digital databus, separate from the databus supporting the navigation system.

Fourth generation avionic architectures evolved in response to advances in digital signal processing technologies. As the electronics used to switch digital signals progressed, it became feasible to process signals from multiple distinct aircraft systems within a single high-throughput switch. Digital signals from the navigation system, as well as signals from communications and other systems, are brought to a central facility for processing and distribution. The centralized processing and switching that defines fourth generation avionic architectures create opportunities for the integration of information that were previously unattainable.

In military aircraft, for instance, information from multiple systems may be integrated by way of the central facility to support a pilot during a mission. For example, the central facility may integrate information from radar systems, indicating, for example, presence of an aircraft with a specific threat signature (e.g., friend or foe), with a digital map of the terrain and mission profile, to create a comprehensive situational awareness for the pilot. Other information pertinent to the mission, such as the location and activities of other mission participants, could be integrated within the same situational awareness.

Other opportunities borne out of adoption of the central facility included wholesale changes to development, and in turn, manufacturing of processing equipments. For example, most, if not all, of the processing equipments have identical or substantially identical modular hardware elements. Initially, the modular hardware elements are not configured for any specific processing functions. The specific processing functions implemented are determined through software design and application of the software design to the modular hardware elements. In effect, what previously had been a dedicated hardware element with associated dedicated software, has evolved into multi-functional hardware elements with dedicated software. By developing software for a known, common hardware platform, development time and cost were reduced substantially, and upgrading system capabilities became a software development task.

In advanced tactical fighter aircraft, such as the E2-D, F/A-18 and F-35, integrated switching is provided by core switches and switching. In other advanced aircraft, integrated switching is provided by core switches and switching fabrics that are based upon the Ethernet standard promulgated by the Institute for Electrical and Electronics Engineers ("IEEE") under IEEE 802.3; derivatives of the Ethernet protocol, such as Aircraft Full Duplex ("AFDX"); or Aeronautical Radio, Incorporated ("ARINC") standard 644P7 ("ARINC 664P7"). In these tactical aircraft, digital signals from the navigation, communications, radar, electronic warfare and electro-optic systems are brought to the core switch, which routes and forwards the digital signals to their destinations for subsequent processing. Switched signals are carried in electronic format using electrical wiring or in optical format using optical fiber.

The above generations of avionics architecture may not be sufficient for the data capacity requirements in that, for example, anticipated data capacity requirements may overwhelm the capabilities of core switches. Specifically, projections for aggregated data throughput on typical tactical or transport aircraft are expected to exceed 1 Tb/s in the near future. At the same time, a single optical fiber has the capacity to carry more than 10 Tb/s (10,000 Gb/s) of information. This may exceed the switching capacity a core switch fabric on an aircraft. The resulting disparity between switching requirements and the capabilities of an electronic core switch fabric indicate a need for a high capacity switching technology that is compatible with operation on aircraft platforms.

Thus, there is a need for supporting legacy aircraft, having distributed or unified avionics architectures, as well as the need to support the next generation aircrafts, to anticipate the new generation data capacity requirements.

SUMMARY

Provided herein are examples of a networking architecture and a unified network for vehicles, such as aircrafts, satellites, watercrafts and the like, as well as for other (i.e., non-vehicular) applications. Also provided herein are examples of (i) various switch fabrics of the unified network; (ii) a composite switch fabric formed from the various switch fabrics; (iii) transport elements of the various switch fabrics and/or composite switch fabric ("switch-fabric transport elements"); (iv)

switches of respective switch-fabric transport elements; and (v) a method of communicating in the unified network.

By way of example, a switch fabric is provided. The switch fabric may be part of a unified network that also includes a plurality of network nodes. The switch fabric may include a plurality of transport elements and one or more first signal-communication media. The transport elements may be adapted to communicatively couple and to communicate, via the first signal-communication media, one or more signals ("transport signals") adapted for communication among any of the plurality of transport elements. At least one transport element of the plurality of transport elements may be further adapted to communicate, via a second signal-communication media, one or more signals and/or one or more sets of electrical (collectively "electrical signals") originating from and/or terminating to one or more network nodes. Each of the electrical signals may be formatted in accordance with a protocol for electrical signals. And one or more of the transport signals may include the electrical signals in adapted form. Additionally and/or alternatively, one or more of the transport signals may be formed from, or as a function of, the electrical signals.

The first and second signal-communication media may be, and links therein may be formed in, any number of various physical media. Such physical media may include, for example, any of optical transmission media (e.g., optical fibers), electrical transmission lines and wireless media.

In some instances, one or more of the transport elements may be adapted to perform a signal aggregation function. These transport elements may be adapted to aggregate the electrical signals. Additionally, any of the transport elements may be any of core, Fibre-Channel and wavelength-division-multiplexing ("WDM") switches. Any of the transport elements may be a signal-coupling edge device, as well.

The signal-coupling edge device may include a switch ("signal-coupling switch"). The signal-coupling switch may include first, second and third ports. The first port may be adapted to (i) receive the electrical signals originated from a first network node of the unified network; and (ii) adapt the electrical signal so as to form a first adapted signal for communication to any of the second and third ports. The signal-coupling switch may be adapted to (i) communicatively couple any of the first, second and third ports via the first signal-communication medium; and (ii) mediate, in accordance with an access protocol for shared media, switching of the first adapted signal to any of the second and third ports. The second port may be adapted to (i) receive the first adapted signal; and (ii) adapt the first adapted signal so as to form a second adapted signal for communication to a second network node of the unified network. The third port may be adapted to (i) receive the first adapted signal; and adapt the first adapted signal so as to form a third adapted signal for communication to one or more other switch-fabric transport elements via one or more links formed in the second signal-communication medium communicatively coupling the third port and the other switch-fabric transport elements.

In some instances, the third port may be adapted to communicate the third adapted signal via the link, the first and third adapted signals may be formatted in accordance with the same protocol, and the second adapted signal may be formatted in accordance with the same protocol as the electrical signals.

The signal-coupling switch may further include a forth port. This fourth port may be adapted to receive the electrical signals originated from a third node of the unified network, and adapt these electrical signal to form a fourth adapted signal for communication to any of the second and third ports.

And the signal-coupling switch may be further adapted to aggregate the first and fourth adapted signals into the first adapted signal.

In some instances, one or more of the other switch-fabric transport elements may include a switch ("second-transport-element switch"). The second-transport-element switch may include fifth and sixth ports. The fifth port may be adapted to (i) receive the third adapted signal, and (ii) adapt the third adapted signal so as to form a fifth adapted signal for communication to the sixth port. In these instances, the second-transport-element switch may be adapted to (i) communicatively couple any of the fifth and sixth ports via the first signal-communication medium, and (ii) mediate switching of the fifth adapted signal to the sixth port in accordance with the access protocol for shared media. The sixth port may be adapted to (i) receive the fifth adapted signal, and adapt the fifth adapted signal so as to form a sixth adapted signal for communication to a fourth network node.

The unified network may include multiple switch fabrics that together form a composite switch fabric. The composite switch fabric may be formed, for example, from the plurality of transport elements and the first signal-communication media noted above. In some instances, the composite switch fabric may include two switch fabrics; one formed from one set of the plurality of transport elements, and another formed from another set of the plurality of transport elements.

The composite switch fabric may also include three switch fabrics. For example, a first switch fabric may be formed from a set of WDM switches and one or more links in the first signal-communication media ("intra-fabric links") communicatively coupling the WDM switches. A second switch fabric may be formed from a set of core switches along with intra-fabric links communicatively coupling the core switches and intra-fabric links communicatively coupling the core switches to the first switch fabric. A third switch fabric may be formed from a set of signal-coupling edge devices and intra-fabric links communicatively coupling the signal-coupling edge devices to any of the first and second switch fabrics (e.g., using intra-fabric links communicatively coupling the signal-coupling edge devices to the core switches and/or to the WDM switches). The three switch fabrics (e.g., the switch-fabric transport elements, intra-fabric links and connections thereof) may be arranged in any number of other ways, as well.

The composite switch fabric may also include more than three switch fabrics. These switch fabrics may be arranged in any manner consistent with and/or contemplated by the foregoing and following description and explicit and/or inherent teachings thereof.

In some instances of the composite switch fabric and/or the unified network, the signal-coupling switches are adapted to format the first and third adapted signals in accordance with the same protocol. Additionally and/or alternatively, the signal-coupling switches are (via, for example, respective ports therein) collect the electrical signals from multiple sources, and aggregate the electrical signals into the first adapted signals.

Additionally, in instances of the composite switch fabric and/or the unified network, any of the first signal-coupling edge devices may include first, second, third, fourth ports that operate bidirectionally. In these instances, the third port is additionally adapted to receive transport signals from other switch-fabric transport elements, and adapt the transport signals for communication to the first, second and forth ports. And each of the first, second and fourth ports are additionally adapted to operate bidirectionally.

A method of communicating in the unified network is also provided. The method may include receiving, at a first port of a first switch-fabric transport element, the electrical signal originated from the first network node, and adapting the electrical signal so as to form a first adapted signal for communication to any of the second and third ports of the first switch-fabric transport element. The method may also include communicatively coupling any of the first, second and third ports via a signal-communication medium, and mediating switching of the first adapted signal to any of the second and third ports in accordance with an access protocol for shared media. The method may further include receiving, by the second port, the first adapted signal, and adapting the first adapted signal so as to form a second adapted signal for communication to the second network node. The method may also include receiving, at the third port, the first adapted signal, and adapting the first adapted signal so as to form a third adapted signal for communication to a second switch-fabric transport elements via at least one link formed in the signal-communication medium communicatively coupling the third port and second switch-fabric transport element.

Additionally and/or alternatively, the method may include receiving, at a fourth port of the first switch-fabric transport element, the electrical signal originated from a third network node, and adapting these electrical signals so as to form a fourth adapted signal for communication to any of the second and third ports. The method may also include aggregating the first and fourth adapted signals into the first adapted signal.

In some instances, the method may further include receiving the third adapted signal at a fifth port of the second switch-fabric transport element, and adapting the third adapted signal so as to form a fifth adapted signal for communication to a sixth port of the second switch-fabric transport element. In addition, the method may include communicatively coupling any of the fifth and sixth ports via the signal-communication medium; mediating switching of the fifth adapted signal to the sixth port in accordance with an access protocol for shared media; receiving the fifth adapted signal at the sixth port; and adapting the fifth adapted signal so as to form a sixth adapted signal for communication to the third network node.

BRIEF DESCRIPTION OF THE DRAWINGS

So the manner in which above recited features of the present invention can be understood in detail, a more particular description of embodiments of the present invention, briefly summarized above, may be had by reference to embodiments, several of which are illustrated in the appended drawings.

Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

Figure 1A:
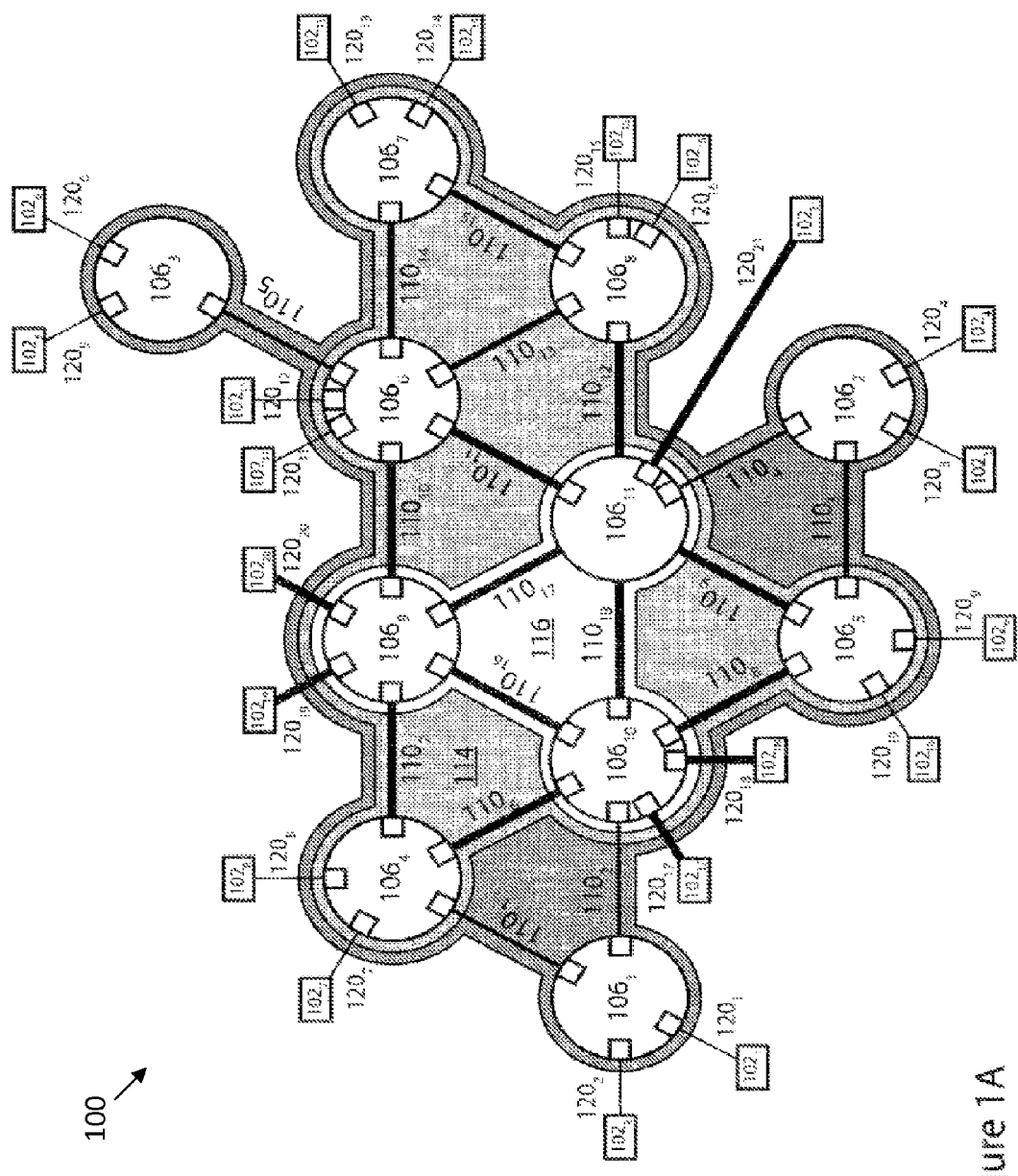
FIGS. 1A-1D are block diagrams illustrating an example of a unified network.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

In the following detailed description, numerous specific details are set forth in order to provide a thorough understanding of embodiments or other examples described herein. In some instances, well-known methods, procedures, components and circuits have not been described in detail, so as to not obscure the following description.

Further, the examples disclosed are for exemplary purposes only and other examples may be employed in lieu of, or in combination with, the examples disclosed. It should also be noted the examples presented herein should not be construed as limiting of the scope of embodiments of the present disclosure, as other equally effective examples are possible and likely.

Overview

Included herein are multiple examples of a networking architecture and a unified network for vehicles, such as aircrafts, satellites, watercrafts and the like, as well as, for other (i.e., non-vehicular) applications. At least some these multiple examples relate to at least aeronautics architectures for legacy aircraft, and "fifth" or newer generation aircrafts, which aircraft will be demanding as they relate to increased data capacity requirements.

Also provided herein are multiple examples of (i) various switch fabrics of the unified network; (ii) a composite switch fabric formed from the various switch fabrics; (iii) transport elements of the various switch fabrics and/or the composite switch fabric ("switch-fabric transport elements"); (iv) switches of respective switch-fabric transport elements; and (v) a method of communicating in the unified network.

Unified Network Example

FIGS. 1A-1D are block diagrams illustrating an example of a unified network 100. The unified network 100 may include a plurality of network nodes $102_{1-21}$ and a composite switch fabric 104. The composite switch fabric 104 may include switch-fabric transport elements $106_{1-11}$ and signal-communication media (shown generally as "108"). The switch-fabric transport elements $106_{1-11}$ may communicatively couple via intra-fabric links $110_{1-18}$ of the signal-communication media 108. The network nodes $102_{1-21}$ may communicatively couple to the switch-fabric transport elements $106_{1-11}$ via links ("node-coupling links") $120_{1-22}$. These node-coupling links $120_{1-22}$ along with the intra-fabric links $110_{1-18}$ may be formed in physical media, such as, any of optical fiber, electrical transmission lines and wireless media.

Figure 1B:
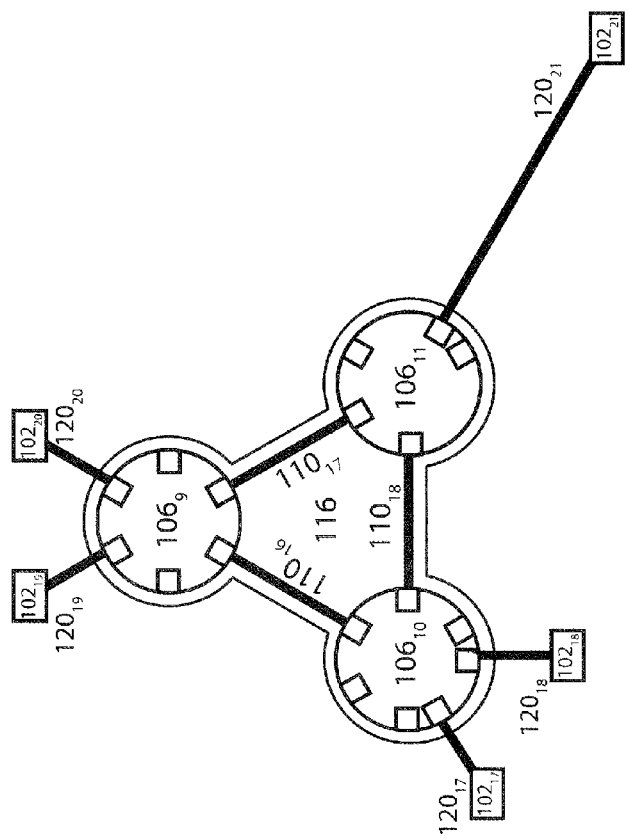
Figure 1C:
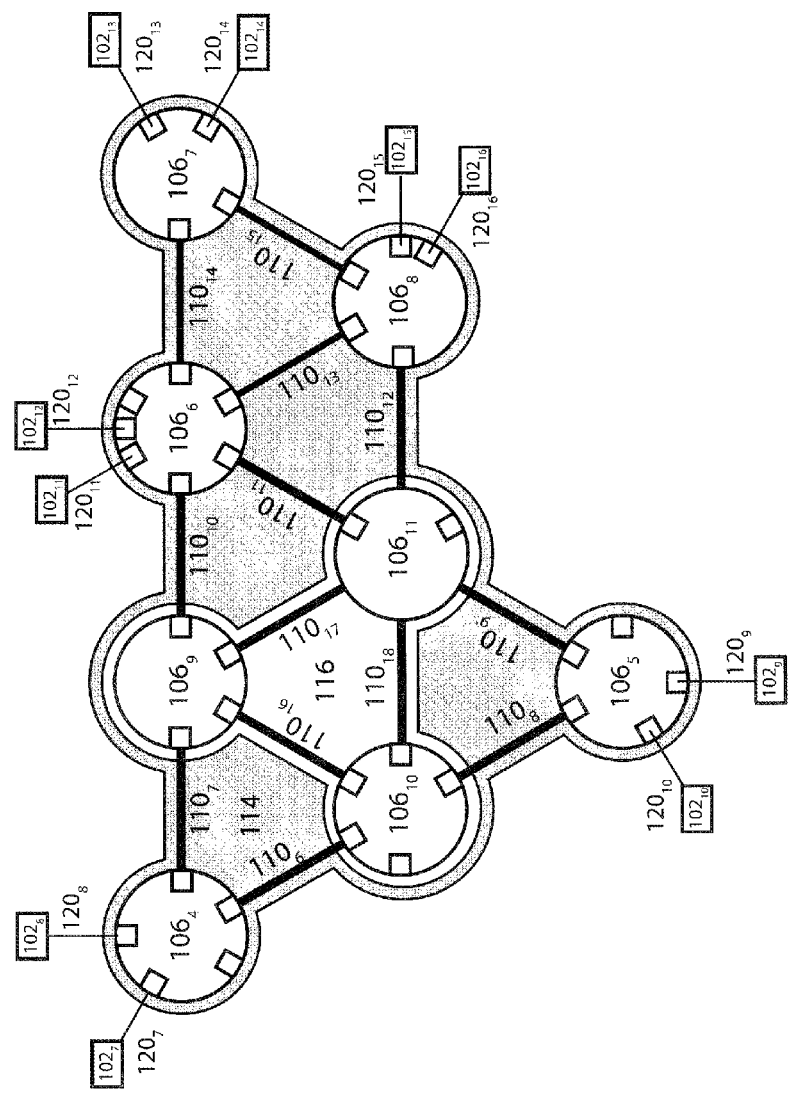
Figure 1D:
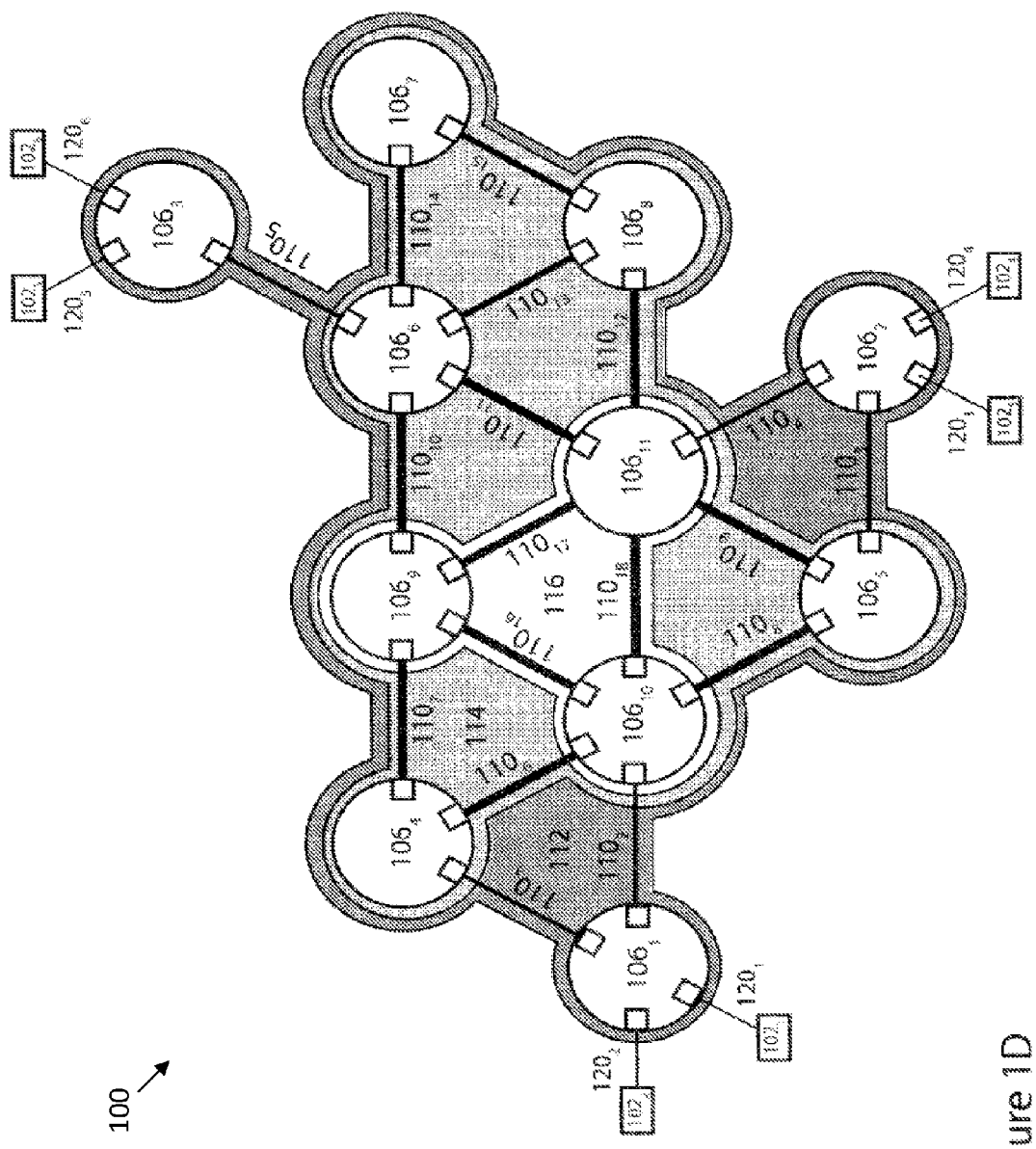

The intra-fabric links $110_1 110_{1-16}$ and the switch-fabric transport elements $106_{1-11}$ may be arranged so as to form first, second and third switch fabrics 112, 114 and 116. For example, as shown in FIG. 1B, the switch-fabric transport elements $106_{9-11}$ via connections over the intra-fabric links $110_{16-18}$ may form the third switch fabric 116. As shown in FIG. 1C, the switch-fabric transport elements $106_{4-8}$ and the third switch fabric 116 via connections with the intra-fabric links $110_{6-15}$ may form the second switch fabric 114. As shown in FIG. 1D, the switch-fabric transport elements $106_{1-3}$, second switch fabric 114 and third switch fabric 116 via connections with the intra-fabric links $0.110_{1-5}$ may form the first switch fabric 112. Together, the first, second and third switch fabrics 112, 114 and 116 may form the composite switch fabric 104 through which communications between and/or among (collectively "among") any of the switch-fabric transport elements $106_{1-3}$ may be transported.

Intra-fabric communications among any of the switch-fabric transport elements $106_{1-3}$ may formatted in accordance with a first protocol. Intra-fabric communications among any of the switch-fabric transport elements $106_{4-8}$ may formatted in accordance with a second protocol. Similarly, intra-fabric communications among any of the switch-fabric transport elements $106_{9-11}$ may formatted in accordance with a third protocol.

To facilitate inter-fabric communications between the first switch-fabric transport elements $106_{1-3}$ and second switch-fabric transport elements $106_{4-8}$, respectively, either or both of the first and second protocols may be adapted (e.g., define extensions) for interoperability between the first and second protocols. Similarly, either or both of the second and third protocols may be adapted for interoperability between the second and third protocols to facilitate inter-fabric communications between the second switch-fabric transport elements $106_{1-2}$ and the third switch-fabric transport elements $106_{9-11}$. Further, either or both of the first and third protocols may be adapted for interoperability between the first and third protocols to facilitate inter-fabric communications between the first switch-fabric transport elements $106_{1-2}$ and the third switch-fabric transport elements $106_{10-11}$.

Alternative Unified Network Example

Figure 2A:
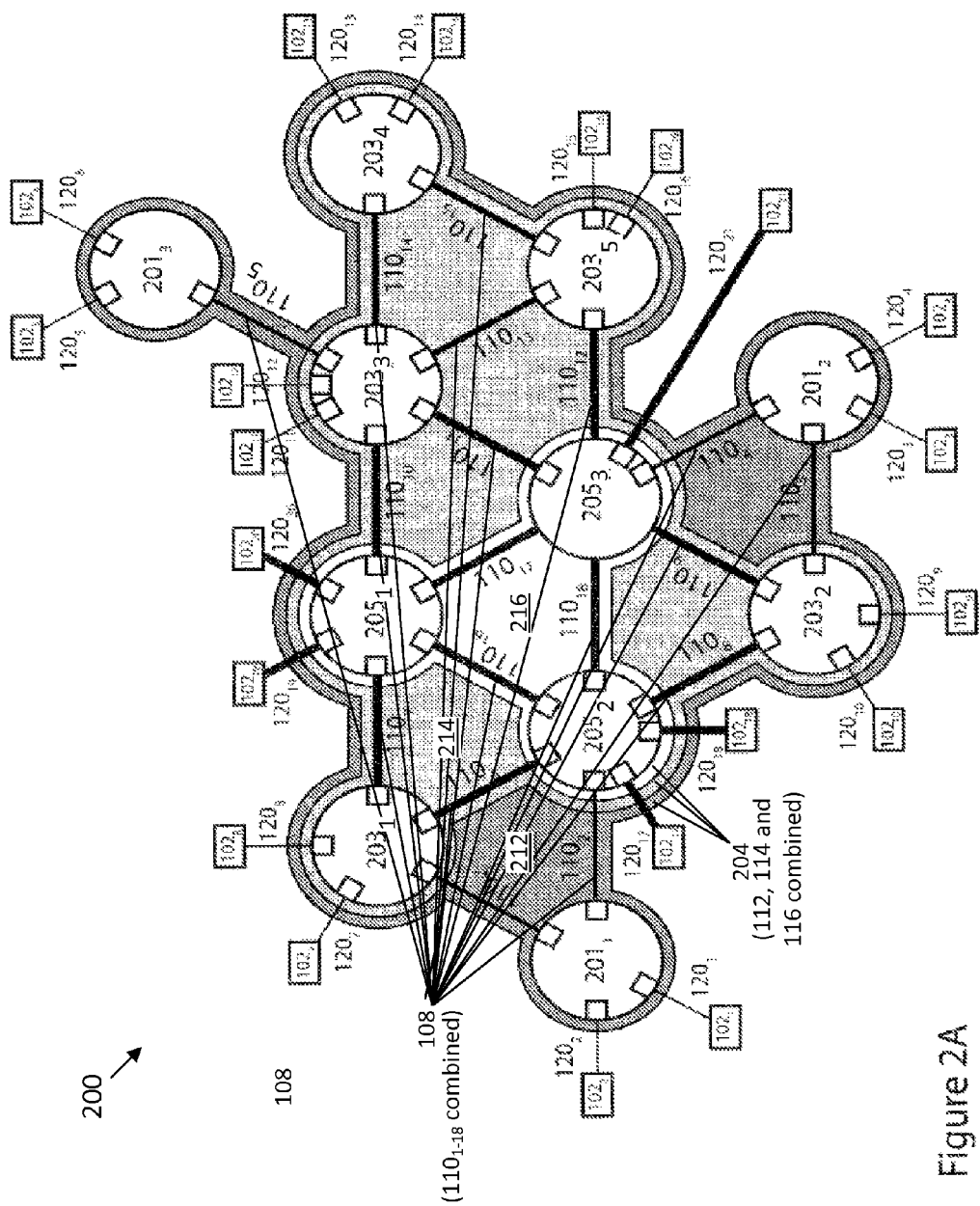
FIG. 2A is a block diagram illustrating another example of a unified network 200.

FIG. 2A is a block diagram illustrating another example of a unified network 200. The unified network 200 of FIG. 2A is similar to the unified network 100 of FIGS. 1A-1D, except provided herein.

The unified network 200 may include the network nodes $102_{1-22}$ and a composite switch fabric 204. The composite switch fabric 204 may include the signal-communication media 108 and switch-fabric transport elements, namely, signal-coupling edge devices $201_{1-3}$, core switches $203_{1-5}$ and switches adapted in accordance with wavelength-division multiplexing ("WDM switches") $205_{1-3}$.

Composite Switch Fabric Example

The WDM switches $205_{1-3}$ may communicatively couple via the intra-fabric links $110_{16-18}$, and together, may form a switch fabric ("WDM switch fabric") 216 in accordance with WDM. The core switches $203_{1-5}$ may communicatively couple via the intra-fabric links $110_{6-15}$ and the WDM switch fabric 216 so as to form a core switch fabric 214. The signal-coupling edge devices $201_{1-3}$ may communicatively couple via the intra-fabric links $110_{1-5}$, WDM switch fabric 216 and core switch fabric 214. Together, the signal-coupling edge devices $201_{1-3}$, the intra-fabric links $110_{1-5}$, WDM switch fabric 216 and core switch fabric 214 may form an switch fabric 212 for transport of communications received, transmitted and exchanged using the signal-coupling edge devices $201_{1-3}$. The switch fabric 112, core fabric 214 and WDM fabric 216, in combination, form the composite switch fabric 204.

Network Node Example

Each of the network nodes $102_{1-22}$ may be any of an electrical, electronic and optical device that falls within, i.e., is a member of, one of a number of classes of devices ("device classes"). In general, the device classes may be defined by respective class definitions, where each device-class definition may define one or more signal characteristics ("device-class signal characteristics") corresponding to each of a set of electrical and/or optical signals. These device-class signal characteristics may include any of a format, type, protocol, parameter, classifying indicia, differentiating indicia and the like of the electrical and/or optical signals.

The device classes may include, for example, first, second and third device classes; each of which may be defined by respective device-class definitions. The first device-class definition may define the first device-class signal characteristics. These first device-class signal characteristics may correspond to a first set of electrical signals ("first device-class signals"), which include, for example, discrete electrical signals, analog electrical signals, electrical signals formed in accordance with Aeronautical Radio, Incorporated ("ARINC") standard 429 ("ARINC 429") and the like.

The second device class may be defined by a second device-class definition. The second device-class definition may define the second device-class signal characteristics, which correspond to a second set of electrical or optical signals ("second device-class signals"). The second device-class signals include, for example, digital communication signals. These digital communication signals may be formed in accordance with one or more digital-communications protocols. Examples of such digital-communication protocols include the Ethernet protocol, such as IEEE 802.3; derivatives of the Ethernet protocol, such as AFDX Ethernet and ARINC 664P7; asynchronous transfer mode ("ATM") protocol; and like-type digital-communication protocols. Alternatively, the digital-communication signals may be formed in accordance with one or more digital-communications protocols, such as any of the Fibre-Channel and like-type protocols.

The third device class may be defined by a third device-class definition. The third device-class definition, in turn, may define the third device-class signal characteristics, which may correspond to a set of optical signals ("third device-class signals"). The third device-class signals include, for example, unformatted optical signals.

The network nodes $102_{1-6}$ may include respective ports adapted to exchange the first device-class signals (hereinafter "first device-class nodes $102_{1-6}$"). As used herein, the term "port" may be any entity that actively communicates over a network, and not necessarily a hardware port.

The first device class nodes $102_{1-6}$ may be, for example, onboard electrical and electronic equipments or devices ("onboard devices"). Examples of such onboard devices include any of a terminal device; line-replaceable unit ("LRU"); equipment for command and control, communication and defense applications, where such equipments are adapted to exchange the first device-class signals; and other like-type device adapted to exchange the first device-class signals.

The network nodes $102_{7-15}$ may include respective ports adapted to exchange the second device-class signals (hereinafter "second device-class nodes $102_{7-16}$"). The second device-class nodes $102_{7-15}$ may be, for example, communication devices that are adapted to exchange digital-communication signals. Examples of such communication devices include edge devices (e.g., routers, switches, gateways, etc.) of one or more other networks. In an avionics context, these other networks may, for instance, handle communication for any of navigation, communications, radar, electronic-warfare and like-type systems.

The network nodes $102_{17-21}$ may include respective ports adapted to exchange the third device-class signals (hereinafter "third device-class nodes $102_{17-21}$"). The third device-class nodes $102_{17-21}$ may be, for example, devices that are adapted to exchange unformatted optical signals. Examples of such devices may include an antenna adapted to provide radio frequency ("RF") analog optical signals to the composite switch fabric, and a bank of receivers adated to receive the RF analog optical signals from the composite switch fabric 204. The third device-class nodes may be other devices, as well.

Signal-Coupling Edge Device Example

Figure 2B:
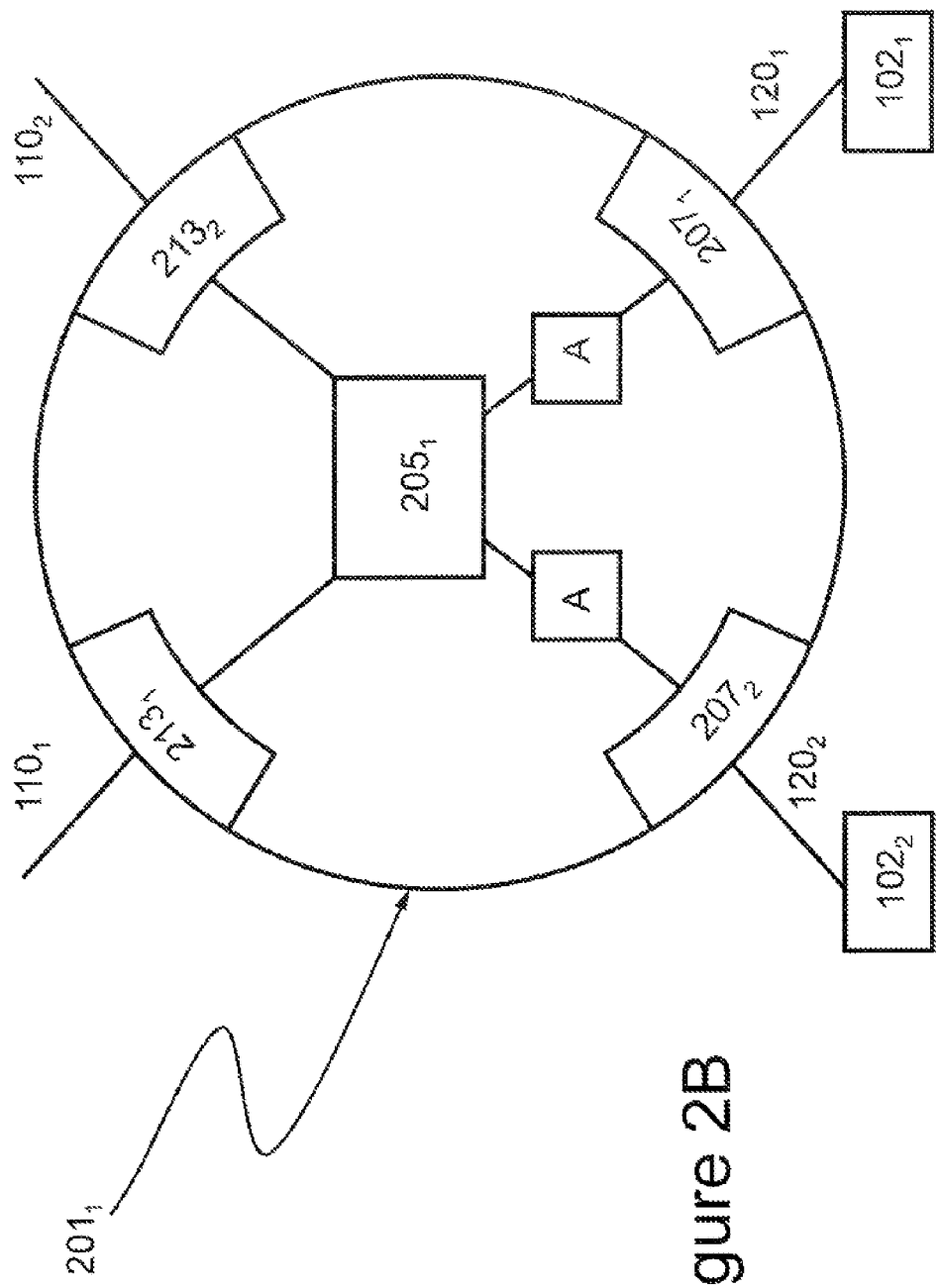
FIGS. 2B and 2C are block diagrams illustrating examples of signal-coupling edge devices.
Figure 2C:
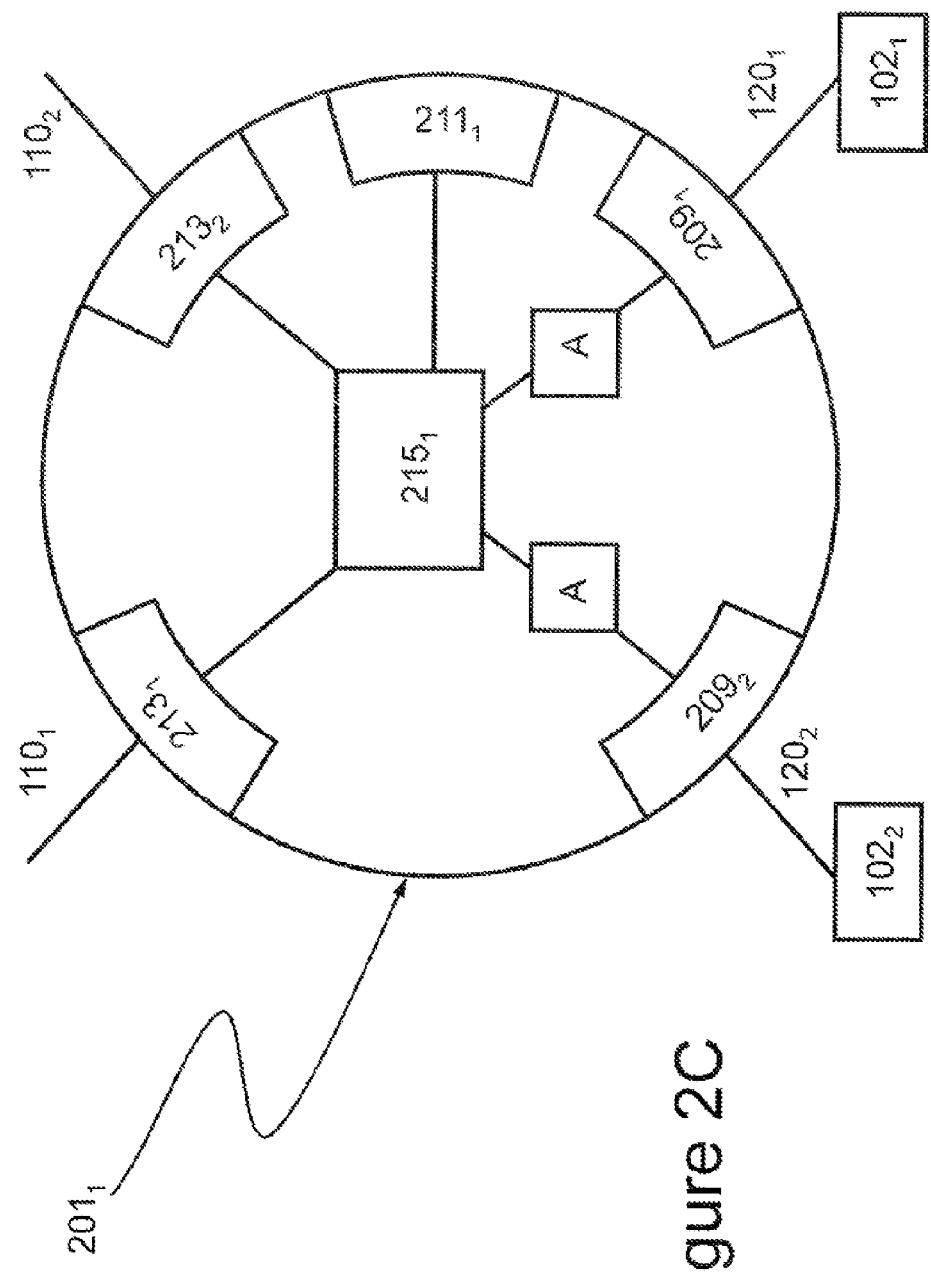

Referring now to FIGS. 2B and 2C, block diagrams illustrating example of signal coupling edge devices $201_1$ and $215_1$ are shown. The signal-coupling edge device $201_1$ may include an number of elements; most of which are not shown so as to not obscure the following description. Numerous details of a device, which may be representative of the signal-coupling edge device $201_1$, may be found in U.S. Pat. Nos. 7,362,936, 7,515,797 and 7,515,798. For simplicity of exposition, the disclosures of the U.S. Pat. Nos. 7,362,936, 7,515, 797 and 7,515,798 are incorporated herein in their entirety. The signal-coupling edge device $201_1$ may include elements other than and/or in addition to the elements of the representative device. The signal-coupling edge device $201_1$ may be other devices, as well.

The signal-coupling edge device $201_1$ may include a switch ("signal-coupling switch") $205_1$ along with first and second ports $207_{1-2}$. These first and second ports (hereinafter "first device-class n-ports") $207_{1-2}$ are adapted to handle receipt, transmission and/or exchange of the first device-class signals originated from and/or terminated to the first device-class nodes $102_{1-2}$, respectively.

Signal-Coupling Switch Example

The signal-coupling switch $215_1$ may be an optical switch and/or a electrical switch. For simplicity of exposition, the signal-coupling switch $215_1$ described herein is embodied as an optical switch. However, details, functions and principles of the signal-coupling switch $215_1$, as described, are equally applicable to being embodied as an electrical switch.

The signal-coupling switch $215_1$ may include three ports, namely, a first adaptation port ("A-port") $209_1$, a second A-port $209_2$ and an E-port $211_1$. Each of the first A-port $209_1$, second A-port $209_2$ and E-port $211_1$ may interface and communicatively couple with a portion of the signal-communication media 108 disposed within the signal-coupling switch $215_1$ (hereinafter "intra-switch medium $213_1$"). This intra-switch medium $213_1$ may be any physical media, including, for example, any of optical fiber, electrical transmission lines and wireless media.

The signal-coupling switch $215_1$ is adapted to carry out network management for communications exchanged internally over the intra-switch medium $213_1$ ("intra-switch network management"), as well as for communications exchanged over the larger composite switch fabric ("inter-fabric network management"). The signal-coupling switch $215_1$ may, for example, carry out the inter-fabric network management in accordance one or more access protocols adapted for interoperability between the signal-coupling switch $215_1$ core switch $203_1$ and/or WDM switch $205_1$. Alternatively, the access protocols adapted for interoperability among any of the signal-coupling switch $215_1$, core switch $203_1$, WDM switch $205_1$ and the other switch-fabric transport elements indirectly coupled to the signal-coupling switch $215_1$.

For portions of the composite switch fabric 204 involving communications among the core switches $203_{1-5}$ and/or the core switch fabric 214, the access protocol may be and/or based on standard network transmission protocols, and in particular, optical network protocols, including any of Synchronous Optical Networking ("SONET"), Synchronous Digital Hierarchy ("SDH"), Fibre-channel, and MIL-STD-1773 protocols. The access protocol for communications internal to the core switches $203_{1-5}$ may be and/or based on the same standard protocols.

For portions of the composite switch fabric 204 involving communications among WDM switches $205_{1-3}$ and/or the WDM switch fabric 216, the access protocol may be and/or based on WDM. The access protocol for communications internal to the WDM switches $205_{1-3}$ may, likewise, be and/or be based on WDM.

The signal-coupling switch $215_1$ may carry out the intra-switch network management in accordance an access protocol for shared media ("shared-medium access protocol"). The shared-medium access protocol may be defined in accordance with and/or based on appropriate (e.g., shared media access definition) portions of standard network transmission protocols, and in particular to, optical network protocols, including any of SONET, SDH, MIL-STD-1773, and Ethernet (IEEE 802.3) Passive Optical Network protocols.

Alternatively, the shared-medium access protocol may be defined in accordance with and/or based on one or more custom-designed protocols. As an example, the Ethernet (IEEE 802.3) Passive Optical Network defines a protocol stack. This protocol stack defines multiple layers, including, at its lowest layer, a physical ("PHY") layer protocol, which in turn, defines an 8B/10B PHY layer modulation subcode.

The PHY layer protocol may be adapted and implemented to facilitate correction of transmission errors. For example, the PHY layer protocol may be adapted and implemented with an error-correcting modulation subcode that replaces the standard 8B/10B PHY layer modulation subcode. The error-correcting modulation subcode may facilitate the correction of transmission errors at the PHY layer, leaving all higher protocol layers unchanged, so that processing in protocol above the PHY layer are unaffected.

To facilitate the intra-switch network management, the signal-coupling switch $205_1$ may be adapted to establish one or more connections among any of the first A-port $209_1$, second A-port $209_2$ and E-port $211_1$ via the intra-switch medium $213_1$. The signal-coupling switch $215_1$ may also be adapted to mediate switching, or otherwise manage exchanges, of data streams among any of the first A-port $209_1$, second A-port $209_2$ and E-port $211_1$ in accordance with the shared-medium access protocol.

The first A-port $209_1$ may be adapted to receive, from the first device-class n-port $207_1$, the first device-class signals originated from the first device-class node $201_1$. The first A-port $209_1$ may be further adapted to adapt the first device-class signals so as to form first shared-medium signals for communication to any of the second A-port $209_2$ and E-port $211_1$. Details of an example adaption process suitable for use by the first A-port $209_1$ along with architecture for performing the same may be found in U.S. Pat. Nos. 7,362,936, 7,515,797 and 7,515,798.

To facilitate the adaption process, the first A-port $209_1$ may be adapted to perform electrical to optical (E/O) conversion and signal conditioning to the first device-class signals to convert (e.g., digitize and/or level shift as appropriate) and multiplex them into a single data stream. This data stream may be encoded and framed to allow robust, error-free transmission. The resultant data steam is the first shared-medium signals. The first A-port $209_1$ may use other adaptation processes, as well.

The signal-coupling switch $215_1$ may be further adapted to route, switch and forward the first shared-medium signals to any of the second A-port $209_2$ and E-port $211_1$. The second A-port $209_2$ may be adapted to receive the first shared-medium signals, and to adapt these signals to form outgoing A-port electrical signals for communication to the first device-class n-port $207_2$ and for termination to first device-class node $102_2$. Details of an example adaption process suitable for use by the second A-port $209_2$ along with architecture for performing the same may be found in U.S. Pat. Nos. 7,362,936, 7,515,797 and 7,515,798. To facilitate this adaption process, the second A-port $209_2$ may be adapted to perform optical to electrical (O/E) conversion and signal conditioning to the first shared-medium signals to deframe, demultiplex and convert them into the resultant outgoing A-port electrical signals.

The first A-port $209_1$ may use other adaptation processes, as well. Although the outgoing A-port electrical signals have the first device-class signal characteristics, such outgoing A-port electrical signals, after adaptation, need not have the same first device-class signal characteristics as the first device-class signals.

Like the second A-port $209_2$, the E-port $211_1$ may be adapted to receive the first shared-medium signals. The E-port $211_1$ may also be adapted to adapt the first shared-medium signals to form second shared-medium signals for communication to a port (e.g., an E-port) of the core switch $203_1$ over the inter-fabric link $110_1$ and/or a port of the WDM switch $205_2$ over the inter-fabric link $110_2$.

In addition to adapting the signals for communication, the E-port $211_1$ may be also adapted to carry out communication of the second shared-medium signals via the inter-fabric links $110_{1-2}$. Alternatively and/or additionally, in embodiments in which the port of the core switch $203_1$ is adapted to handle the first shared-medium signals, the E-port $211_1$ might not be adapted to adapt the first shared-medium signals to form the second shared-medium signals. Instead, the E-port $211_1$ may be adapted to relay, dispatch, forward or otherwise communicate the first shared-medium signals to the core switch $203_1$ over the inter-fabric link $110_1$ and/or the WDM switch $205_2$ over the inter-fabric link $110_2$.

Pursuant to other alternative embodiments in which the first and second shared-medium signals are formed in accordance with the same shared-medium access protocol, the E-port $211_1$ may be adapted to adapt the first shared-medium signals to form the second shared-medium signals. In these alternative embodiments, forming the second shared-medium signals may consist of adapting the first shared-medium signals for dispatch, forwarding or otherwise communication to the core switch $203_1$ over the inter-fabric link $110_1$ and/or the WDM switch $205_2$ over the inter-fabric link $110_2$. In some instances, such second shared-medium signals may be identical to the first shared-medium signals. In other instances, the second shared-medium signals may differ from the first shared-medium signals in accordance with permissible variations specified in the shared-medium access protocol. These permissible variations are typically defined in one or more layers of a protocol stack of the shared-medium access protocol, and may include, for example, variations to protocol data units specified therein.

In additional alternative embodiments in which the first and second shared-medium signals are formed in accordance with the same shared-medium access protocol, the E-port $211_1$ may be adapted to (i) adapt the first shared-medium signals to form the second shared-medium signals; and (ii) forego adapting the first shared-medium signals to form the second shared-medium signals (notwithstanding being so adapted), and instead, relay, dispatch, forward or otherwise communicate to the first shared-medium signals as, or in place of, the second shared-medium signals.

The E-port $211_1$, as described, is adapted to include functionality for operating as an gateway, router and/or switch (with or without signal adaptation), and carry out forwarding shared-medium signals from the signal-coupling switch $215_1$ to the core switch $203_1$ over the inter-fabric link $110_1$ and/or the WDM switch $205_2$ over the inter-fabric link $110_2$. The E-port $211_1$, however, may be adapted to include the same or similar functionality to carry out forwarding, to the signal-coupling switch $215_1$, shared-medium signals received over the inter-fabric links $110_{1-2}$ from the core switch $203_1$ and/or the WDM switch $205_2$, respectively.

The first A-port $209_1$, as described, is adapted to include functionality for operating as an input to the composite switch fabric 204 for the first device-class signals, and the second A-port $209_1$, as described, is adapted to include functionality for operating as an output from the composite switch fabric 204 for the outgoing A-port electrical signals. In practice, the first A-port $209_1$ may be further adapted to include functionality for operating as an output from the composite switch fabric 204 for outgoing A-port electrical signals, and the second A-port $209_1$ may be adapted to include functionality for operating as an input to the composite switch fabric 204 for first device-class signals. This way, each of the first and second A-ports $209_1$, $209_2$ may be adapted to operate bidirectionally.

Figure 3:
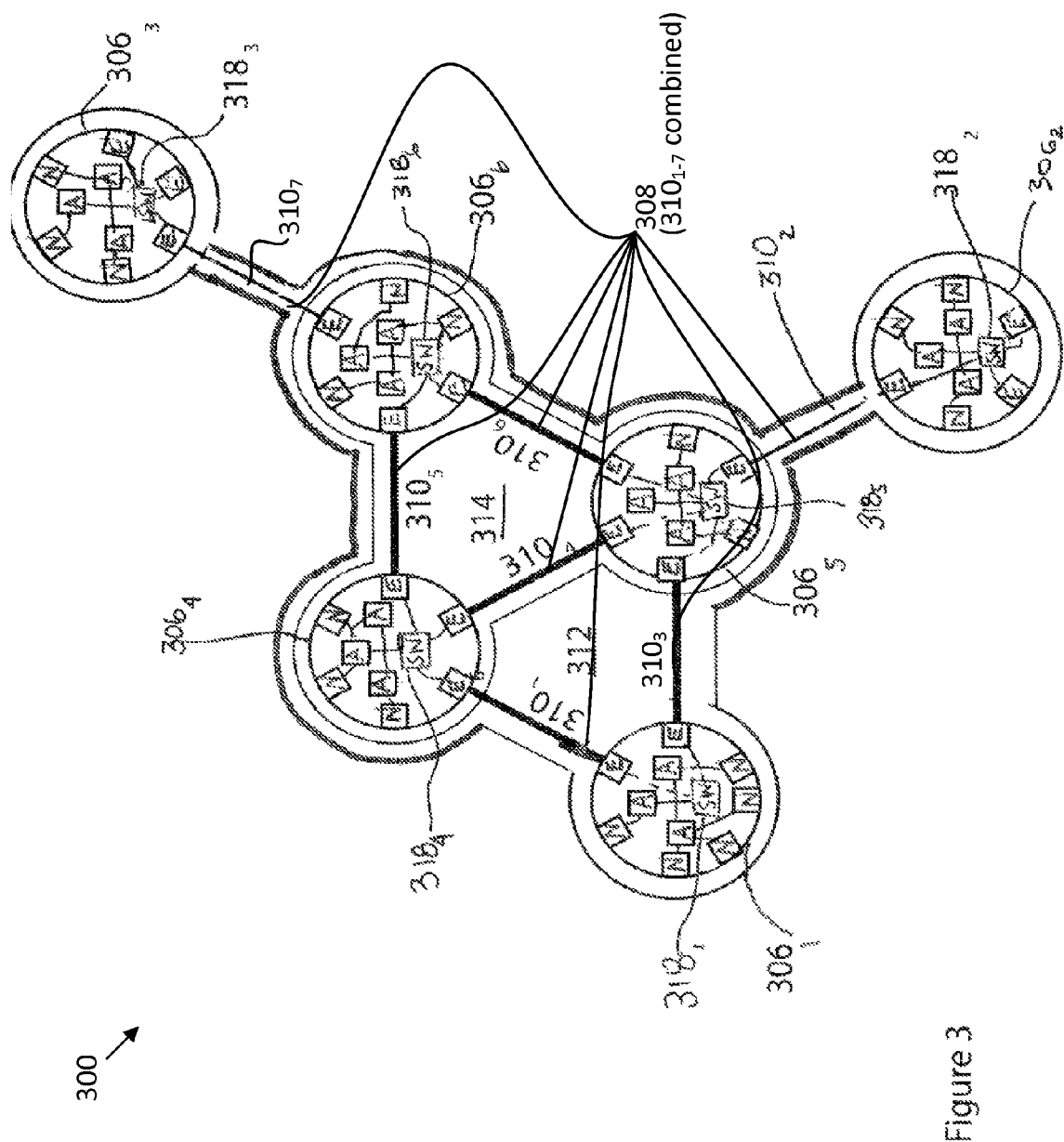
FIG. 3 is a block diagram illustrating an alternative example of composite switch fabric.
Figure 4:
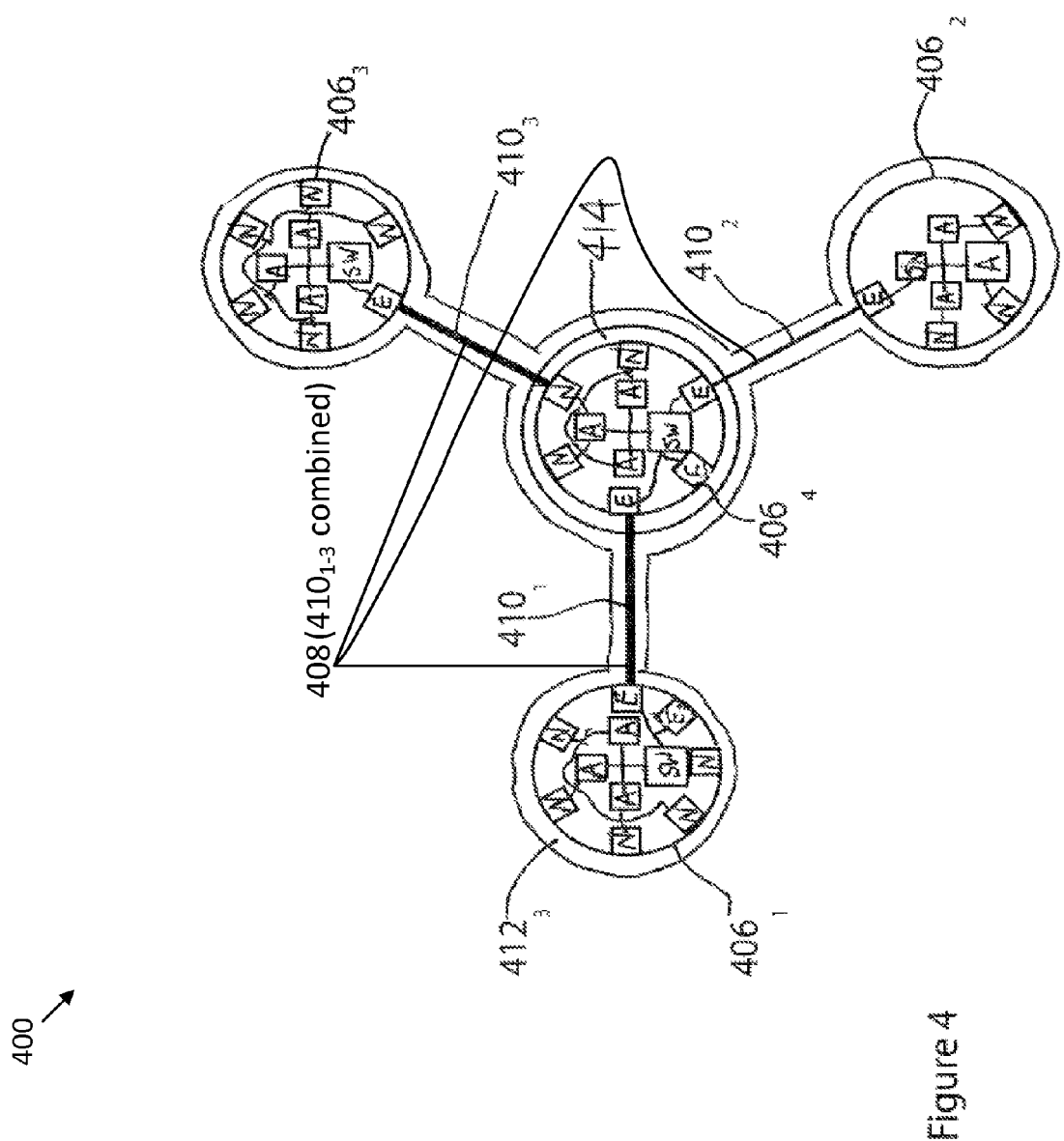
FIG. 4 is a block diagram illustrating an alternative example of composite switch fabric.
Figure 5:
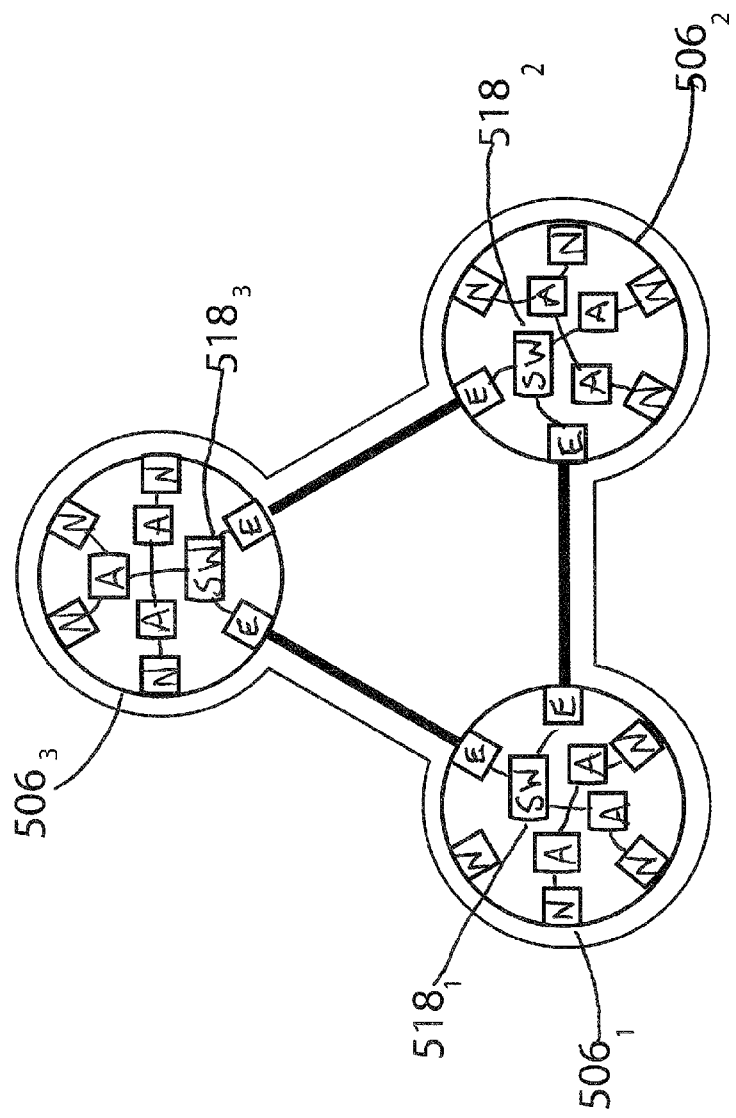
FIG. 5 is a block diagram illustrating a first device-class switch fabric.

Further, although the signal-coupling switch $205_1$, as shown, includes three ports, it may include only two ports. In such case, one port is an A-port, and the other port is an E-port. Alternatively, the signal-coupling switch $205_1$ may, and generally do, include more ports. These ports may be additional A-ports and/or additional E-ports. Examples of both are shown in FIGS. 3, 4 and 5. In addition, each of the other signal-coupling edge devices $201_{2-3}$ may include the same elements and functionality, and be adapted to operate in the same or similar manner, as the signal-coupling edge device $201_1$.

Alternative Composite Switch Fabric Examples

FIG. 3 is a block diagram illustrating an alternative example of composite switch fabric 300. The composite switch fabric 300 may include signal-communication media 308 and six switch-fabric transport elements, namely, signal-coupling edge devices $306_{1-3}$ and core switches $306_{4-6}$. The optical-communication media 308 may include intra-fabric links $310_{1-6}$.

The core switches $306_{4-6}$ may communicatively couple via the intra-fabric links $310_{4-6}$ to form a core switch fabric 314. The signal-coupling edge devices $306_{1-3}$ may communicatively couple via the intra-fabric links $310_{1-7}$ and core switch fabric 314. The inter-coupling of the signal-coupling edge devices $306_{1-3}$, intra-fabric links $310_{1-7}$ and core switch fabric 314 form the switch fabric 312, and in turn, the composite switch fabric 300. Like the composite switch fabric 200 of FIG. 2, the composite switch fabric 300 of FIG. 3 defines multiple, interconnected switch fabrics that allow communication among one or indirectly connected signal-coupling edge devices $306_{1-3}$.

Each of the signal-coupling edge devices $306_{1-3}$ includes an signal-coupling switch 318, an E-port (designated by "E") and multiple A-ports (each designated by "A"), and is adapted to perform at least the functions of the signal-coupling edge devices $206_1$ of FIG. 2. Additionally, each of the signal-coupling switches $318_{1-3}$ (and the signal-coupling switch $318_1$ of the signal-coupling edge device $206_1$ of FIG. 2) may also be adapted to aggregate the first device-class signals received at multiple A-ports into adapted signals ("adapted-aggregate signals") for communication to any of the other A-ports and the E-port. The E-port, in turn, may be adapted to (i) receive the adapted-aggregate signals, (ii) adapt the adapted-aggregate signals for communication to the core switch network 314, and (iii) communicate them to the core switch network 314.

Each of the multiple A-ports may be adapted (i) receive the adapted-aggregate signals, extract desired first device-class signals from the adapted-aggregate signals. In addition, each of the A-ports may be further adapted to adapt the extracted first device-class signals into outgoing A-port electrical signals for communication to a corresponding first device-class n-port (designated "N") for termination to a corresponding first device-class node.

Referring now to FIG. 4, a block diagram illustrating an alternative example of composite switch fabric 400, is shown. The composite switch fabric 400 may include signal-communication media 400 and four switch-fabric transport elements, namely, signal-coupling edge devices 406$_{1-3}$ and core switch 406$_4$. The signal-communication media 408 may include intra-fabric links 410$_{1-3}$. The composite switch fabric 400 of FIG. 4 is similar to the composite switch fabrics 104, 204 and 300 of FIGS. 1, 2 and 3 respectively, except as described herein.

The core switch 406$_4$ forms a basis of a core switch fabric 414. The signal-coupling edge devices 406$_{1-3}$ may communicatively couple via the intra-fabric links 410$_{1-3}$ and the core switch fabric 414. The inter-coupling of the signal-coupling edge devices 406$_{1-3}$, intra-fabric links 410$_{1-3}$ and core switch fabric 414 form the composite switch fabric 400. Like the composite switch fabrics 200, 300 of FIGS. 2 and 3, the composite switch fabric 400 of FIG. 4 defines multiple, interconnected switch fabrics that allow communication among one or indirectly connected signal-coupling edge devices 406$_{1-3}$.

Signal-Coupling Switch Fabric Example

FIG. 5 is a block diagram illustrating a first device-class switch fabric 500. This first device-class switch fabric 500 may be employed in connection with a composite switch fabric, such as the composite switch fabrics 104, 204, 300 and 400 of FIGS. 1, 2, 3 and 4, respectively. Alternatively, the first device-class switch fabric 500 may be employed in a stand alone manner (i.e., not in connection with other switch fabrics).

The first device-class switch fabric 500 may include first, second and third signal-coupling edge devices 506$_{1-3}$. Each of the first, second and third signal-coupling edge devices 506$_{1-3}$ may include a signal-coupling switch 518, multiple E-ports (designated by "E") and multiple A-ports (each designated by "A"), and is adapted to perform at least the functions of the signal-coupling edge devices 306$_1$ of FIG. 3. The additional E-ports provide for additional data capacity of and throughput for the switch fabric 500, and if integrated with a larger, composite switch fabric, for that composite switch fabric, as well.

Method of Communication Example

Figure 6:
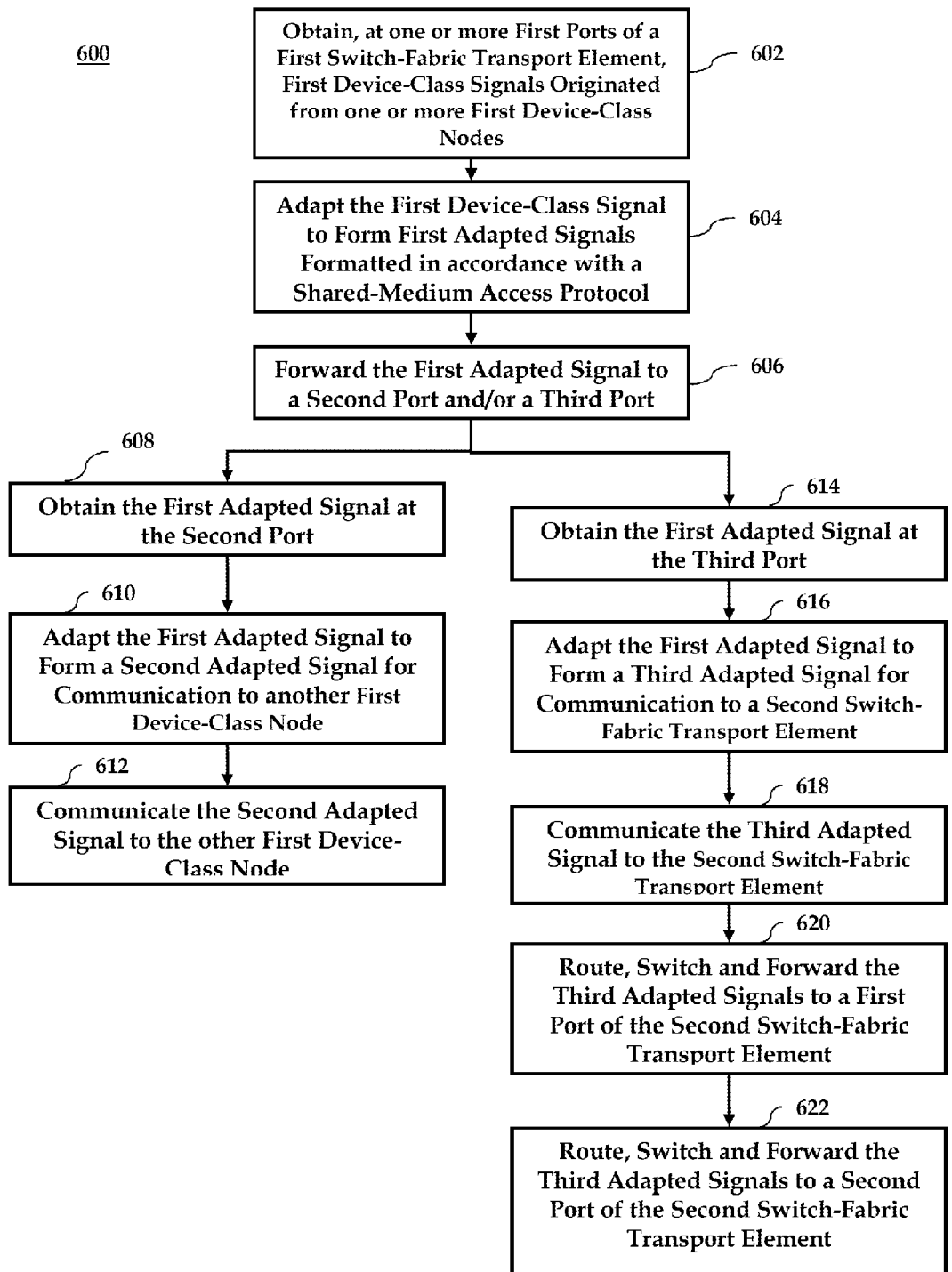
FIG. 6 is a flow diagram illustrating an example flow for carrying out a communication in a unified network.

FIG. 6 is a flow diagram illustrating an example flow 600 for carrying out a communication in a unified network, such as, for example, the unified networks 100 and 200 of FIGS. 1 and 2, respectively. The flow 600 is described with reference to the unified network 200 for convenience. The flow 600 may be caned out in other networks, as well.

To facilitate carrying out the flow 600, each of the signal-coupling edge devices 206$_{1-3}$, core switches 206$_{4-8}$ and WDM switches 206$_{9-11}$ (and/or the switches thereof) perform inter-fabric and intra-switch network management in accordance with corresponding access protocols. In this regard, the signal-coupling edge devices 206$_{1-3}$, core switches 206$_{4-8}$ and WDM switches 206$_{9-11}$ and/or the switches thereof, when and where appropriate, establish inter-fabric and intra-switch connections and links. For example, the signal-coupling switch 215$_1$ may establish, in accordance with the shared-medium access protocol, connections among any of the first A-port 209$_1$, second A-port 209$_1$ and E-port 211$_1$ via the intra-switch medium 213$_1$ for communications exchanged among such ports. The signal-coupling edge devices 206$_{1-3}$, core switches 206$_{4-8}$ and WDM switches 206$_{9-11}$ and/or the switches thereof, when and where appropriate, may also establish connections to the network nodes 102 via respective first device-class, second device-class and third device class n-ports.

To begin the communication, the signal-coupling switch 215$_1$ may establish a connection between the first device-class n-port 207$_1$ and first device-class node 102$_1$. Once established, the first device-class node 102$_1$ may originate first device-class signals to first device-class n-port 207$_1$, and the first device-class n-port 207$_1$ may receive such first device-class signals.

After receipt at the first device-class n-port 207$_1$, the first A-port 209$_1$ may obtain of the first device-class signals, as shown in block 602. Typically, the first A-port 209$_1$ obtains the first device-class signals as a result of the signal-coupling switch 215$_1$ carrying out a scheduling routine that routes, switches and/or forwards the signals from the first device-class n-port 207$_1$ to the first A-port 209$_1$. Alternatively, the first A-port 209$_1$ may receive the first device-class signals in response to polling the first device-class n-port 207$_1$.

After obtaining the first device-class signals, the first A-port 209$_1$ may adapt them to form first shared-medium signals for communication to any of the second A-port 209$_1$ and E-port 211$_1$, as shown in block 604. The first A-port 209$_1$ may adapt the first device-class signals in accordance with the adaption process found in U.S. Pat. Nos. 7,362,936, 7,515,797 and 7,515,798. For example, the first A-port 209$_1$ may perform electrical to optical (E/O) conversion and signal conditioning to the first device-class signals to convert and multiplex them into a single data stream. The A-port 209$_1$ may then encode and frame the data stream the first shared-medium signals. The first A-port 209$_1$ may use other adaptation processes, as well.

The signal-coupling switch 215$_1$ may be further adapted to route, switch and forward the first shared-medium signal to any of the second A-port 209$_1$ and E-port 211$_1$, as shown in block 606. The signal-coupling switch 215$_1$ may do this by mediating switching, or otherwise managing exchanges, of data streams among any of the first A-port 209$_1$, second A-port 209$_1$ and E-port 211$_1$ in accordance with the shared-medium access protocol.

Thereafter, the second A-port 209$_1$ may obtain the first shared-medium signals, as shown in block 608. At block 610, the second A-port 209$_1$ may adapt the first shared-medium signals to form outgoing A-port electrical signals for communication to the first device-class n-port 207$_2$ and for termination to first device-class node 102$_2$. The second A-port 209$_1$ may do so using the example adaption process found in U.S. Pat. Nos. 7,362,936, 7,515,797 and 7,515,798. The second A-port 209$_1$ may perform, for example, optical to electrical (WE) conversion and signal conditioning to the first shared-medium signals to de-frame, de-multiplex and convert them into the resultant outgoing A-port electrical signals. The first A-port 209$_1$ may use other adaptation processes, as well.

After the adaptation is performed, the outgoing A-port electrical signals may be communicated to first device-class node 102$_2$, as shown in block 612. The outgoing A-port electrical signals may be communicated to first device-class node 102$_2$ as a result of the signal-coupling switch 215$_1$ carrying out the scheduling routine, which routes, switches and/or forwards the signals from the first A-port $209_1$ to the first device-class n-port $207_2$, and in turn, from the first device-class n-port $207_2$ to the first device-class node $102_2$. Alternatively, the first device-class n-port $207_1$ may receive the signals from the second A-port $209_2$ in response to polling the second A-port $207_2$.

After communicating the outgoing A-port electrical signals to first device-class node $102_2$, the flow 600 may terminate. Alternatively, the flow 600 may continue to block 614, whereupon, the E-port $211_1$ may obtain the first shared-medium signals. The E-port $211_1$ may obtain the first shared-medium signals as a result the scheduling routine carried out by the signal-coupling switch $215_1$, which routes, switches and/or forwards such signals from the first A-port $209_1$ to the E-port $211_1$. Alternatively, the E-port $211_1$ may receive the first shared-medium signals in response to polling the first A-port $209_1$.

After receipt, the E-port $211_1$ may adapt the first shared-medium signals to form second shared-medium signals for communication to a port (e.g., an E-port) of the core switch $205_1$ over the inter-fabric link $110_1$, as shown in block 616. Alternatively, the E-port $211_1$ might not adapt the first shared-medium signals to form the second shared-medium signals if the port of the core switch $205_1$ is adapted to handle the first shared-medium signals. Instead, the E-port $211_1$ may relay, dispatch, forward or otherwise communicate the first shared-medium signals to the port of the core switch $205_1$ via the inter-fabric link $110_1$.

The E-port $211_1$ may communicate the second shared-medium signals via the inter-fabric link $110_1$, as shown in block 618. The second shared-medium signals may be communicated to the core switch $206_4$ as a result of the scheduling routine carried out by the signal-coupling switch $215_1$, which routes, switches and/or forwards the signals from the E-port $211_1$ to port of the core switch $205_1$.

After receipt, the core switch $205_1$ routes, switches and forwards the second shared-medium signals to an E-port of the switch of signal-coupling edge device $205_1$ (assuming the destination of the information in the second shared-medium signals is a network node communicatively coupled to the signal-coupling edge device $205_1$), as shown in block 620. At block 622, the switch of signal-coupling edge device $205_1$ route, switch and forward the second shared-medium signals to any of its A-ports communicatively coupled to the destination network node. Thereafter, the destination A-port preforms the functions of process blocks 608-612 for termination to the destination network node, whereupon the flow 600 terminates.

While the foregoing is directed to embodiments of the present disclosure, other and further embodiments of the invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A switch fabric comprising: a plurality of transport elements adapted to communicatively couple and to communicate, via a first signal-communication medium, a first signal adapted for communication among any of the plurality of transport elements, wherein at least one transport element of the plurality of transport elements is adapted to communicate, via a second signal-communication medium, any of a second signal originating from a first network node and a third signal for termination to a second network node, wherein the second and third signals are formatted in accordance with a protocol for electrical signals, and wherein the first signal comprises an adapted form of any of the second and third signals wherein:
   the at least one transport element comprises a switch,
   the switch comprises: first, second and third ports;
   the first port is adapted to: receive the second signal; and adapt the second signal so as to form a first adapted signal for communication to any of the second and third ports;
   the switch is adapted to: communicatively couple any of the first, second and third ports;
   and mediate, in accordance with an access protocol for shared media, switching of the first adapted signal to any of the second and third ports;
   the second port is adapted to: receive the first adapted signal; and adapt the first adapted signal so as to form the third signal;
   and the third port is adapted to: receive the first adapted signal; and adapt the first adapted signal so as to form a third adapted signal for communication to at least one other transport element via at least one link formed in the signal-communication medium communicatively coupling the third port and the at least one other transport element.

2. The switch fabric of claim 1, wherein the third port is further adapted to communicate the third adapted signal via the link.

3. The switch fabric of claim 1, wherein the first and third adapted signals are formatted in accordance with the same protocol.

4. The switch fabric of claim 1, wherein the second adapted signal is formatted in accordance with the protocol for electrical signals.

5. The switch fabric of claim 1, wherein:
   the switch further comprises: a fourth port;
   the fourth port is adapted to: receive a fourth signal formatted in accordance with a protocol for electrical signals, the fourth signal originating from a third network node; and adapt the fourth signal so as to form a fourth adapted signal for communication to any of the second and third ports; and
   the switch is further adapted to: aggregate the first and fourth adapted signals into the first adapted signal.

6. The switch fabric of claim 1, wherein at least one other transport element comprises any of a core switch, Fibre-Channel switch and wavelength-division-multiplexing switch.

7. The switch fabric of claim 1, wherein:
the second element comprises a second switch;
the second switch comprises: fifth and sixth ports;
the fifth port is adapted to: receive the third adapted signal; and adapt the third adapted signal so as to form a fifth adapted signal for communication to the sixth port;
the second switch is adapted to: communicatively couple any of the fifth and sixth ports via the first signal-communication medium; and mediate, in accordance with an access protocol for shared media, switching of the fifth adapted signal to the sixth port; and
the sixth port is adapted to: receive the fifth adapted signal; and adapt the fifth adapted signal so as to form a sixth adapted signal for communication to a third node of the unified network.

8. The switch fabric of claim 7, wherein the third and fifth adapted signals are formatted in accordance with the same protocol.

9. The switch fabric of claim 7, wherein the sixth adapted signal is formatted in accordance with the protocol for electrical signals.

10. The switch fabric of claim 1, wherein:
the at least one second transport element comprises at least one second switch;
the at least one second switch comprises: fourth, fifth and sixth ports;
the fifth port is adapted to: receive fourth signal formatted in accordance with a protocol for electrical signals, the fourth signal originating from a third network node; and adapt the fourth signal so as to form a fourth adapted signal for communication to any of the fourth and sixth ports;
the at least one second switch is adapted to: communicatively couple any of the fourth, fifth and sixth ports via the signal-communication medium; and mediate, in accordance with the access protocol for shared media, switching of the fourth adapted signal to any of the fourth and sixth ports;
the sixth port is adapted to: receive the fourth adapted signal; and adapt the fourth adapted signal so as to form a fifth adapted signal for communication to a fifth network node; and
the fourth port is adapted to: receive the fourth adapted signal; and adapt the fourth adapted signal so as to form a sixth adapted signal for communication to the third port via at least one link formed in the signal-communication medium communicatively coupling the third and fourth ports.

11. The switch fabric of claim 10, wherein the third port is further adapted to communicate the third adapted signal via the link.

12. The switch fabric of claim 10, wherein the first, third, fourth and sixth adapted signals are formatted in accordance with the same protocol.

13. The switch fabric of claim 1, wherein at least one other transport element of the plurality of transport elements is adapted to exchange any of the second and third signals formatted in accordance with a protocol for digital communications.

14. The switch fabric of claim 13, wherein the at least one other transport element is any of a core switch, a Fibre-Channel switch and a wavelength-division-multiplexing switch.

15. A switch of a first transport element of switch fabric comprising a plurality of transport elements, the switch comprising: first, second and third ports, wherein:
the first port is adapted to: receive an electrical signal formatted in accordance with a protocol for electrical signals, the electrical signal originating from a first network node; and adapt the electrical signal so as to form a first adapted signal for communication to any of the second and third ports;
the first switch is adapted to: communicatively couple any of the first, second and third ports via a signal-communication medium; and mediate, in accordance with an access protocol for shared media, switching of the first adapted signal to any of the second and third ports;
the second port is adapted to: receive the first adapted signal; and adapt the first adapted signal so as to form a second adapted signal for communication to a second network node; and
the third port is adapted to: receive the first adapted signal; and adapt the first adapted signal so as to form a third adapted signal for communication to at least one second transport element via at least one link formed in the signal-communication medium communicatively coupling the third port and the at least one second transport element.

16. The switch of claim 15, wherein:
the switch further comprises: a fourth port;
the fourth port is adapted to: receive a fourth signal formatted in accordance with a protocol for electrical signals, the fourth signal originating from a third network node; and adapt the fourth signal so as to form a fourth adapted signal for communication to any of the second and third ports; and
the switch is further adapted to: aggregate the first and fourth adapted signals into the first adapted signal.

17. A unified network comprising: a switch fabric, a plurality of network nodes, wherein:
the switch fabric comprises: a plurality of transport elements adapted to communicatively couple and to communicate, via a first signal-communication medium, a first signal adapted for communication among any of the plurality of transport elements, wherein at least one transport element of the plurality of transport elements is adapted to communicate, via a second signal-communication medium, any of a second signal originating from a first network node of the plurality of nodes and a third signal for termination to a second network node of the plurality of network nodes, wherein the second and third signals are formatted in accordance with a protocol for electrical signals, and wherein the first signal comprises an adapted form of any of the second and third signals, wherein the switch fabric comprises: first and second switch fabrics; and
the first switch fabric comprises: a first transport element adapted to communicate a first signal formatted in accordance with a protocol for digital communications;
the second switch fabric comprises: a second transport element;
the second transport element comprises a switch;
the switch comprises: first, second and third ports;
the first port is adapted to: receive the second signal; and adapt the second signal so as to form a first adapted signal for communication to any of the second and third ports;
the switch is adapted to: communicatively couple any of the first, second and third ports; and mediate, in accordance with an access protocol for shared media, switching of the first adapted signal to any of the second and third ports;

the second port is adapted to: receive the first adapted signal; and adapt the first adapted signal so as to form the third signal; and the third port is adapted to: receive the first adapted signal; and adapt the first adapted signal so as to form a third adapted signal for communication to at least one other transport element via at least one link formed in the signal-communication medium communicatively coupling the third port and first transport element.

18. The unified network of claim 17, wherein the first transport element is any of a core switch, a Fibre-Channel switch and a wavelength-division-multiplexing switch.

19. The unified network of claim 17, wherein the first and third adapted signals are formatted in accordance with the same protocol.

20. The unified network of claim 17, wherein:
the switch further comprises: a fourth port;
the fourth port is adapted to: receive a fourth signal formatted in accordance with a protocol for electrical signals, the fourth signal originating from a third node of the unified network; and adapt the fourth signal so as to form a fourth adapted signal for communication to any of the second and third ports; and
the switch is further adapted to: aggregate the first and fourth adapted signals into the first adapted signal.

21. The unified network of claim 17, wherein:
the switch is a first switch; the first transport element comprises a second switch;
the second switch comprises: fifth and sixth ports;
the fifth port is adapted to: receive the third adapted signal; and adapt the third adapted signal so as to form a fifth adapted signal for communication to the sixth port;
the second switch is adapted to: communicatively couple any of the fifth and sixth ports via the first signal-communication medium; and mediate, in accordance with an access protocol for shared media, switching of the fifth adapted signal to the sixth port; and the sixth port is adapted to: receive the fifth adapted signal; and adapt the fifth adapted signal so as to form a sixth adapted signal for communication to a third node of the unified network.

22. The unified network of claim 17, wherein:
the first transport element comprises at least one second switch;
the at least one second switch comprises: fourth, fifth and sixth ports;
the fifth port is adapted to: receive fourth signal formatted in accordance with a protocol for electrical signals, the fourth signal originating from a third network node; and adapt the fourth signal so as to form a fourth adapted signal for communication to any of the fourth and sixth ports;
the at least one second switch is adapted to: communicatively couple any of the fourth, fifth and sixth ports via the signal-communication medium; and mediate, in accordance with the access protocol for shared media, switching of the fourth adapted signal to any of the fourth and sixth ports;
the sixth port is adapted to: receive the fourth adapted signal; and adapt the fourth adapted signal so as to form a fifth adapted signal for communication to a fifth network node; and
the fourth port is adapted to: receive the fourth adapted signal; and adapt the fourth adapted signal so as to form a sixth adapted signal for communication to the third port via at least one link formed in the signal-communication medium communicatively coupling the third and fourth ports.

\* \* \* \* \*